UNITED STATES PATENT OFFICE 1,933,799

PROCESS FOR PREPARING PARA-HYDROXY-PHENYL-GLYCINE

Freeman A. Gillice, Irondequoit, N. Y., assignor to Eastman Kodak Company, Rochester, N. Y., a corporation of New York No Drawing. Application August 16, 1930
Serial No. 475,861

16 Claims. (Cl. 260—109)

This invention relates to a process for the preparation of para-hydroxy-phenyl-glycine.

For some time, para-hydroxy-phenyl-glycine has been prepared by the addition of one molecular proportion of monochloracetic acid to two molecular proportions of para-amino-phenol, or by the addition of one molecular proportion of sodium chloracetate to one molecular proportion of para-amino-phenol. The reaction which takes place would theoretically be expected to be as follows:

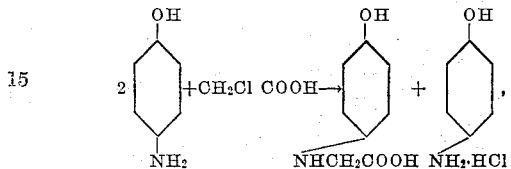

with side reactions involving the production of para-hydroxy-phenyl-amino-diacetic acid and other compounds. The reaction, in practice, however, is thought to take place as follows:

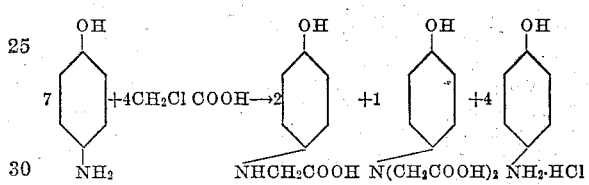

The para-amino-phenol hydrochloride, formed during this reaction, is neutralized and the para-amino-phenol released is again employed in further carrying out the process, the para-hydroxy-phenyl-glycine with impurities being previously removed. The mother liquor containing the para-hydroxy-phenyl-amino-diacetic acid may be discarded. The para-hydroxy-phenyl-glycine so produced, even though thoroughly washed, still contains up to 4% or 5% of para-amino-phenol combined with the para-hydroxy-phenyl-glycine possibly in the form of an anilide. This impurity, due to its inherent nature and to its state of combination with the para-hydroxy-phenyl-glycine, is a very undesirable impurity which deleteriously affects the further use of the product, or which, if it is to be removed, must be subjected to tedious refining operations. Also the glycine formed in accordance with the above precipitates in a very fine state of subdivision, making its removal from its liquors a slow and tedious operation.

I have now found that, by a novel variation of this process, a much more pure form of para-hydroxy-phenyl-glycine may be produced which contains far less of para-amino-phenol as an impurity than did the compound as heretofore commercially produced and hence a much better yield. Also the para-hydroxy-phenyl-glycine produced by my novel process possesses very desirable physical properties, namely, precipitates in the form of flaky crystals which are quite easily separated from the mother liquor by filtration and washing.

It is, therefore, among the objects of my invention to provide a process for the production of para-hydroxy-phenyl-glycine in a form containing far less impurities than heretofore and with a higher yield and more desirable product. Other objects of the invention will become more apparent upon a perusal of the following description.

I have discovered, for instance, that by adding gradually over a period of time a molecular proportion of para-amino-phenol chloracetate to a molecular proportion of para-amino-phenol suspended in water, there is obtained para-hydroxy-phenyl-glycine of a much higher degree of purity and in higher yields than by processes formerly employed, such as those above referred to. For instance, by my novel process, para-hydroxy-phenyl-glycine is produced which contains less than approximately 2% of para-amino-phenol as an impurity, or less than one-half the impurities which were present in the final product heretofore. The para-hydroxy-phenyl-glycine separates out from the reaction mass as a precipitate and, after removal by filtration, the filtrate may be neutralized, whereupon the excess para-amino-phenol precipitates out and may be removed by filtration and reused in the further carrying out of the process. The filtrate may be discarded.

The reaction which occurs is thought to be as follows:

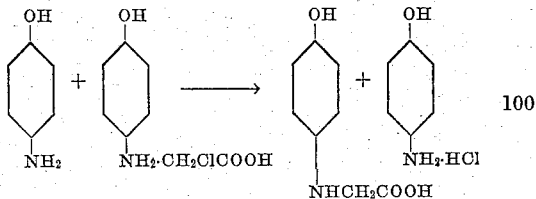

with the possible production of small amounts of para-amino-phenol-diacetic acid or the like.

While my process may very successfully be carried out as above described and broadly comprises the gradual addition to para-amino-phenol of para-amino-phenol-chloracetate, I have also found that the process may even better be carried out by dissolving equal molecular proportions of para-amino-phenol and mono-chloracetic acid at approximately room temperature in an excess of water, whereupon para-aminophenol-chloracetate is formed in solution. This solution may then be gradually added to another equal molecular proportion of para-aminophenol suspended in boiling water. By continuing boiling for a short time after the completion of the addition of the solution of the para-amino-phenol-chloracetate, the reaction will be assured of completion and it will be found that para-hydroxy-phenyl-glycine in an almost pure state has been precipitated out during the reaction.

In addition to the novelty of preparing the glycine by the use of para-amino-phenol-chloracetate, it will be observed that my process is also novel in that I continuously add a small amount of the chloracetate (for instance in from approximately 5 to 25% portions) to a large excess of para-amino-phenol. Thus, the hydrogen chloride generated by the reaction continually finds an excess of para-amino-phenol to which it may attach or by which it is neutralized. This improves the reaction.

In addition to the above, I have found that the para-amino-phenol, precipitated out by neutralization of the filtrate which contains the hydrochloride of the phenol, is accompanied by some tarry or other dark appearing impurity, which, unless removed, would continue to accumulate in the reaction system in the repeated carrying out of the process. I have, therefore, found it of assistance in repeatedly carrying out my process to treat, for a short time, with decolorizing carbon or other agent for removing the foreign matter, the solution of para-amino-phenol-chloracetate produced by reacting monochloracetic acid with para-amino-phenol in the first part of the process. In other words, I form my solution of para-amino-phenol-chloracetate by reacting one mole of monochloracetic acid with one mole of the somewhat impure para-amino-phenol taken off the end of the process and treat this solution with decolorizing carbon. The solution is then filtered and a mole of new para-amino-phenol is reacted with this solution, thus keeping impurities down to a minimum.

As a specific example of my method of producing substantially pure para-hydroxy-phenyl-glycine by my novel process above described, the following is an illustration, although it will be understood that I am in no way to be limited to the specific proportions or other conditions of the reaction, as these may be varied within reasonable limits by one skilled in the art without departing from the spirit or scope of this invention.

One method of carrying out my process is as follows: 218 grams of para-amino-phenol and 188 grams of monochloracetic acid are dissolved at room temperature in approximately 2200 cc. of water, para-amino-phenol chloracetate being thereby formed in solution. This solution is gradually added in small portions, over a period of about two hours, to a mixture of 218 grams of para-amino-phenol suspended in 600 cc. of boiling water, the boiling being continued for an additional half hour after the completion of the addition of the solution of para-amino-phenol chloracetate. Substantially pure para-hydroxy-phenyl-glycine will be found to have precipitated out from the reaction mass and may be removed by filtration; after washing with water it will be found to contain as an impurity less than 2% of para-amino-phenol combined with some of the para-hydroxy-phenyl-glycerine as an anilide. The combined filtrate and washings may then be neutralized, for instance with caustic soda solution; after cooling to approximately 20° C. the para-amino-phenol (freed of hydrochloride) precipitates out and is filtered off and washed for use in future carrying out of the process.

As above referred to, the para-amino-phenol from the tail of the process may be purified simultaneously with the production in solution of the para-amino-phenol-chloracetate. Thus 2 gram moles of the somewhat impure para-amino-phenol from the tail of the process, together with 2 gram moles of monochloracetic acid, may be added to 2200 cc. of water. With thorough mixing, about 10 grams of decolorizing carbon is added and after a short time filtered off. The filtrate, containing practically pure para-amino-phenol-chloracetate is then used as above described to produce para-hydroxy-phenyl-glycine. Thus, impurities do not accumulate in the system.

There will result from this novel process a yield of from 75 to 80% of the amount of para-hydroxy-phenyl-glycine which is theoretically possible. Not only is this yield some 10 to 20% higher than any heretofore commercially practicable, but the para-hydroxy-phenyl-glycine is produced in a physical form far more desirable than that heretofore possible, in that it is not only substantially free from impurities but is in the form of well defined flaky crystals which are much more susceptible to further use than prior known commercial para-hydroxy-phenyl-glycine has been.

In the above example, the caustic alkali referred to may consist of sodium hydroxide, potassium hydroxide or any of the other usual forms of caustic employed for neutralizing purposes. It may be noted that there is a distinct advantage in employing caustic over other alkali, such as the carbonates of the alkali metals, in that in employing the carbonates, for instance, the para-amino-phenol is not recovered for re-use in the process in as desirable a state. Other variations will doubtless occur to those skilled in the art and are, of course, to be included within the spirit of this invention if within the scope of the claims appended hereto.

What I claim as my invention and desire to be secured by Letters Patent of the United States is:

1. Process for the preparation of para-hydroxy-phenyl-glycine which comprises reacting an equimolecular proportion of para-amino-phenol-chloracetate with para-amino-phenol.

2. Process for the preparation of para-hydroxy-phenyl-glycine which comprises reacting small proportions of para-amino-phenol-chloracetate with a quantity of para-amino-phenol.

3. Process for the preparation of para-hydroxy-phenyl-glycine which comprises reacting with para-amino-phenol, an equimolecular quantity of para-amino-phenol-chloracetate in small portions.

4. Process for the preparation of para-hydroxy-phenyl-glycine which comprises reacting an equimolecular proportion of para-amino-phenol-chloracetate with para-amino-phenol suspended in boiling water.

5. Process for the preparation of para-hydroxy-phenyl-glycine which comprises reacting with para-amino-phenol suspended in boiling water, an equimolecular quantity of para-amino-phenol-chloracetate in small portions.

6. Process for the preparation of para-hydroxy-phenyl-glycine which comprises reacting an equimolecular proportion of para-amino-phenol-chloracetate with para-amino-phenol suspended in boiling water and continuing the boiling for a short time thereafter.

7. Process for the preparation of para-hydroxy-phenyl-glycine which comprises reacting with para-amino-phenol suspended in boiling water, an equimolecular quantity of para-amino-phenol-chloracetate in small portions and continuing the boiling for a short time thereafter.

8. Process for the preparation of para-hydroxy-phenyl-glycine which comprises adding an aqueous solution of para-amino-phenol-chloracetate to para-amino-phenol.

9. Process for the preparation of para-hydroxy-phenyl-glycine which comprises adding an aqueous solution of para-amino-phenol-chloracetate to para-amino-phenol suspended in boiling water.

10. Process for the preparation of para-hydroxy-phenyl-glycine which comprises adding an aqueous solution of para-amino-phenol-chloracetate to para-amino-phenol suspended in boiling water, and continuing the boiling for a short time thereafter.

11. Process for the preparation of para-hydroxy-phenyl-glycine which comprises adding in small portions an aqueous solution of a molecular weight of para-amino-phenol-chloracetate to a molecular weight of para-amino-phenol.

12. Process for the preparation of para-hydroxy-phenyl-glycine which comprises adding in small portions an aqueous solution of a molecular weight of para-amino-phenol-chloracetate to a molecular weight of para-amino-phenol suspended in boiling water.

13. Process for the preparation of para-hydroxy-phenyl-glycine which comprises adding in small portions an aqueous solution of a molecular weight of para-amino-phenol-chloracetate to a molecular weight of para-amino-phenol suspended in boiling water, and continuing the boiling for a short time thereafter.

14. A cyclic process of preparing para-hydroxy-phenyl-glycine which comprises reacting in water solution one molecular weight of monochloracetic acid with a quantity of impure material from the end of a previous cycle which contains one molecular weight of para-amino-phenol, treating the solution of para-amino-phenol-chloracetate thus formed with a decolorizing agent, filtering the solution and adding it to a molecular weight of para-amino-phenol.

15. A cyclic process of preparing para-hydroxy-phenyl-glycine which comprises reacting in water solution one molecular weight of monochloracetic acid with a quantity of impure material from the end of a previous cycle which contains one molecular weight of para-amino-phenol, treating the solution of para-amino-phenol-chloracetate thus formed with a decolorizing agent, filtering the solution and adding it in small portions to a molecular weight of para-amino-phenol.

16. A cyclic process of preparing para-hydroxy-phenyl-glycine which comprises reacting in water solution one molecular weight of monochloracetic acid with a quantity of impure material from the end of a previous cycle which contains one molecular weight of para-amino-phenol, treating the solution of para-amino-phenol-chloracetate thus formed with a decolorizing agent, filtering the solution and adding it in small portions to a molecular weight of para-amino-phenol suspended in boiling water.

FREEMAN A. GILLICE.

CERTIFICATE OF CORRECTION.

Patent No. 1,933,799. November 7, 1933.

FREEMAN A. GILLICE.

It is hereby certified that error appears in the printed specification of the above numbered patent requiring correction as follows: Page 2, lines 131, 141-145 and page 3, lines 4-5, claims 1, 4 and 6, respectively, strike out the words "an equimolecular proportion of" and insert the same after the word "reacting" in lines 130, 144 and 4 of said claims; and that the said Letters Patent should be read with these corrections therein that the same may conform to the record of the case in the Patent Office.

Signed and sealed this 26th day of December, A. D. 1933.

Richard Spencer (Seal) Acting Commissioner of Patents.

SUBSTITUTE CERTIFICATE OF CORRECTION.

Patent No. 1,933,799. November 7, 1933.

FREEMAN A. GILLICE.

Notice: This Certificate of Correction is hereby issued as a substitute for the former Certificate of Correction issued December 26, 1933.

It is hereby certified that error appears in the printed specification of the above numbered patent requiring correction as follows: Page 2, line 131, page 2, lines 143 and 144; page 3, lines 4 and 5, claims 1, 4 and 6, respectively, strike out the words "an equimolecular proportion of"; and page 2, line 132; page 2, line 145; page 3, line 6, claims 1, 4 and 6, respectively, after "with" insert an equimolecular proportion of; and that the said Letters Patent should be read with these corrections therein that the same may conform to the record of the case in the Patent Office.

Signed and sealed this 6th day of February, A. D. 1934.

F. M. Hopkins (Seal) Acting Commissioner of Patents.